May 1, 1934.　　　　　F. FALLA　　　　1,957,163
METHOD AND APPARATUS FOR BREWING COFFEE AND THE LIKE
Filed June 6, 1931　　　5 Sheets-Sheet 1

INVENTOR.
FERNANDO FALLA
BY
ATTORNEY.

INVENTOR.
FERNANDO FALLA

Patented May 1, 1934

1,957,163

UNITED STATES PATENT OFFICE 1,957,163

METHOD AND APPARATUS FOR BREWING COFFEE AND THE LIKE

Fernando Falla, Millburn Township, Essex County, N. J.

Application June 6, 1931, Serial No. 542,484

12 Claims. (Cl. 53—3)

The invention relates to a method of and apparatus for preparing beverages, for example, from coffee, grain, etc.

It has for an object the provision of apparatus whereby it is possible to prepare the beverage directly from the green or unroasted bean or the like, including roasting of the raw material, under substantial exclusion of air, and brewing of the beverage before the roasted material has had opportunity to cool. By this expedient, oxidation of the essential oils and volatile alkaloids of the stock is avoided and the beverage has a decidedly better taste. Furthermore, when the beverage is produced on a large scale, considerable economy results in that the material is substantially cheaper in the raw state than when purchased as a roasted product, particularly in view of the novel manner of conducting the roasting operation which does not entail any appreciable cost.

A further object of the invention resides in a novel method of conducting the roasting of the coffee whereby the same is effected under the action of superheated steam, the unused balance of water providing said steam being subsequently utilized in the brewing of the beverage from the roasted material. By thus subjecting the heated coffee to the action of boiling water obtained as aforesaid, the coffee not only does not become cooled substantially below the boiling point of the water, but the latter is better able to extract therefrom at such temperature the aromatic compounds and render them completely soluble in the water as well as preserving these desirable compounds in the prepared beverage.

In the usual method of preparing, for example, coffee, the raw bean is first roasted and then set aside to cool and placed, in accordance with the best practice, in vacuum cans. However, oxygen of the air eventually works into the pores of the roasted coffee and depreciates its quality.

In accordance with the present invention, on the contrary, as soon as the raw coffee, preferably in ground condition, has been sufficiently roasted by means of superheated steam, arrangement is made for passing the heated water, resulting from the provision of said steam, through the roasted charge so that there has been no opportunity for oxidation of the material.

The nature of the invention, however, will best be understood when described in connection with the accompanying drawings, in which:

Fig. 1 is a vertical section illustrating one form of the combined roasting and brewing apparatus.

Figs. 2 and 3 are horizontal sections therethrough taken respectively on the lines 2—2 and 3—3, Fig. 1 of the drawings, and looking in the direction of the arrows.

Figure 1:
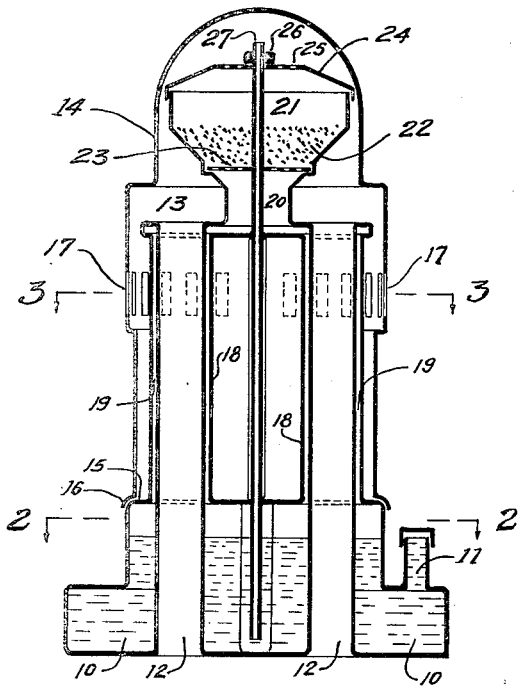
Figure 2:
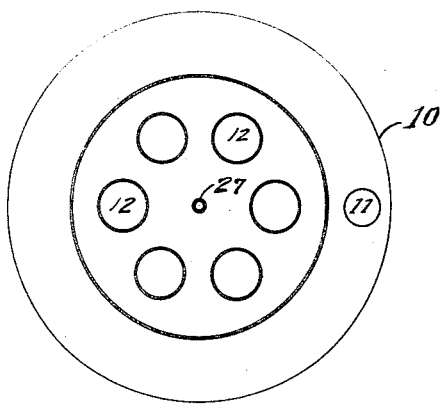
Figure 3:
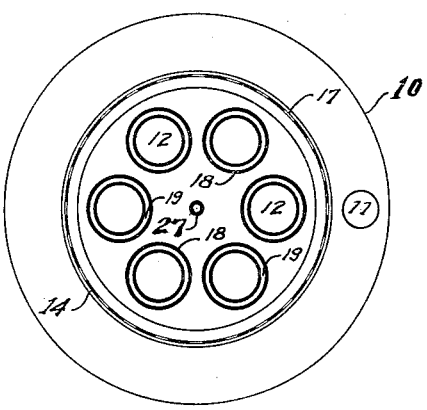
Figure 4:
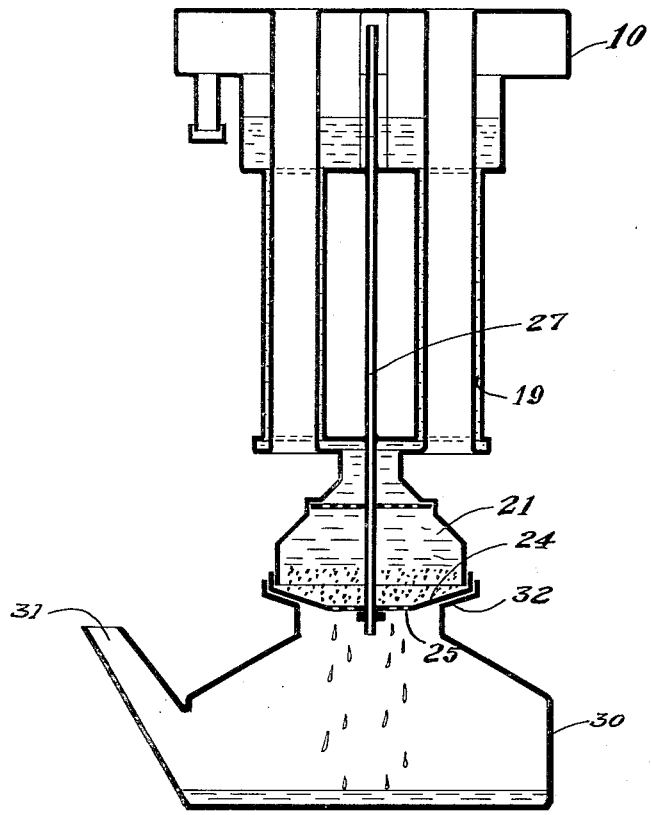
Fig. 4 is a vertical section of the apparatus, with cap removed, and located in inverted position upon a container for receiving the beverage.

Referring to the drawings, 10 designates the base of the apparatus and which serves also as a container or boiler for water, the same being designed to be filled therein through a filling tube 11 until it overflows through the top thereof to thereby determine the level of water in the container and insure a predetermined volume for operation.

Through this container passes one or more vertically disposed flues 12 which discharge at the upper end into a chamber 13 provided by a hood or cap member 14 which is fitted more or less tightly over the apparatus to enclose its upper end. The bottom of the hood rests upon a shoulder 15 afforded by a reduced intermediate portion of the container 10, the lower edge 16 of the hood being flanged to more or less seal the chamber 13; and a series of circumferential outlets 17 is provided through the wall of the hood at its middle portion to finally discharge to the atmosphere spent gases passing upwardly through the flues 12.

These gases may be supplied by setting the apparatus upon the ordinary burner of a gas stove or the like (not shown); or a special burner may be provided, as set forth hereinafter in the description of Fig. 9. Provision is also made for heating the apparatus electrically, and as is more fully set forth in connection with the description of Figs. 5–8, inclusive.

The said flues 12 in passing through the container provide at the upper portion with surrounding cylindrical elements 18 a plurality of superheating passageways 19, annular in cross-section, and of reduced area relatively to their respective flues. Any steam generated in the portion of container 10 retaining the water will, in passing through said passageways, then be superheated by the surrounding high temperature gases passing over the inner wall as well as the outer wall of a superheating passageway.

At their upper ends, the superheating passageways are united in discharging into an outlet 20 at the bottom of a receptacle 21 for retaining a charge of the material to be roasted. This material is indicated at 22, for example, as the ground green beans of coffee, the same being supported by a perforated screen 23 and the receptacle normally being closed by a cap or cover 24.

This cover is perforated as at 25 to serve as an outlet for the spent steam as well as to discharge eventually the brewed coffee, and it is held during the roasting and brewing operations to the receptacle by means of a nut 26 screwed over the outer threaded end of an open-ended vent tube 27. The latter passes axially through the apparatus with its lower end dipping into the water in the bottom of container 10 to remain constantly below the water line in this position of the apparatus. Any undue pressure developing in this container will therefore be relieved through said vent which discharges into the chamber 13 provided by the hood 14 and then out through the openings 17 of said hood.

In operating the apparatus, the container 10 thereof is first filled with water to the predetermined water level, as set forth, and the filler tube 11 sealed by screwing on its cap; also, the charge 22, say of coffee, is placed in the coffee holder 21 as upon the screen 23. The water is then heated as aforesaid, or electrically as hereinafter set forth, and the steam generated thereby passes upwardly through the superheater passageways 19 where it is heated to a degree sufficient to adequately roast the charge, the hood 14 having first been replaced in a position over the cover 24 which has been adjusted and locked in position by the nut 26.

The steam generated after the water in container 10 begins to boil, meets a resistance in the ground coffee as distributed over the plate or screen 23 creating back-pressure on the water in container 10. This acts to raise the level of the water within the venting tube 27. It has been found in operating the novel apparatus that the water will not rise more than one-half the height of the said venting tube, approximately 4-5 inches, so that the pressure developed in the steam does not exceed one-quarter pound per square inch. Of course, should the coffee be utilized unground or coarsely ground, this back-pressure will practically disappear.

The roasting action of the coffee is accomplished in two stages; the first embodying a drying period and the second a roasting period. During the first stage only a moderate temperature is necessary for the purpose of thoroughly drying the ground coffee, while during the second stage a much higher temperature is required in order to brown the ground coffee. This is automatically effected by the particular construction of the water container 10 whereby the degree of superheat obtained is variable, being relatively low during the early stages of the boiling and increasing as the water level lowers during the continued boiling operation, with loss of spent steam through the perforations 25 and outlets 17.

It will be noted that as water boils off, there will be less of the surface of the flues 12 covered thereby and thus not only exposing a greater portion of the generated steam to the hot gases, but effecting a lesser water-cooling action thereon so that the gases themselves are at a higher temperature for superheating purposes. Thus, while the water is substantially still in the upper reduced diameter portion of the container 10 a superheat of, say, 100° (steam temperature of 312° F.) may be obtained, while when the water level falls to the enlarged diameter container portion a critical roasting temperature may be obtained of approximately 400° F. As the cross-sectional area of this container has thus been appreciably and also abruptly increased, the rate of increased exposure of heating surface is diminished so that a more uniform temperature is maintained for the roasting action and the change from one state to the other is sudden. The coffee is thus dried and roasted under the most favorable temperature conditions, and sufficient time is provided to afford a thorough roasting of the coffee at all points of the charge.

When the roasting has been completed, which is ordinarily accomplished in about eight minutes, it is detected by the smell of the vapors discharging through the openings 17. The source of heat is then withdrawn and the hood 14 removed, and the apparatus is left standing idle for several minutes. This is necessary to enable the flues and superheating tubes to cool sufficiently below the boiling point of water to permit of the brewing operation.

Figure 5:
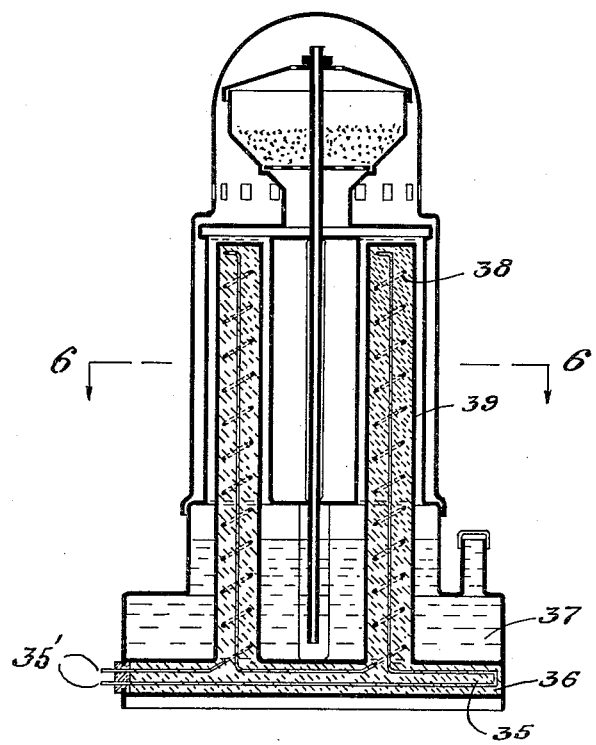
Fig. 5 is a vertical section illustrating a modification.
Figure 6:
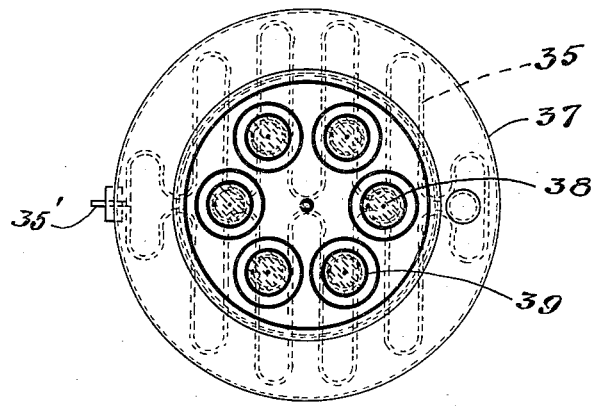
Fig. 6 is a horizontal section therethrough, taken on the line 6—6 and looking in the direction of the arrows.

The brewing operation may be accomplished by adjusting the apparatus to an inverted position upon a suitable receptacle or container as the coffee pot 30, which may be provided with the pouring spout 31 and the opening 32 at the top. Opening 32 is designed to receive and fit about the perforated cover 24 and the whole apparatus is thus supported by the said coffee pot. In this position, the unused balance of the water from container 10 and still boiling hot will travel downwardly under the action of gravity through the superheat passageways 19, the coffee now being in the opposite end of the receptacle 21 and resting upon the inner surface of the perforated cover member 24. The water eventually percolates through the roasted coffee and drops through the perforations 25 of said cover, as indicated, into the coffee pot 30, tube 27 serving now as a vent to allow of the water being withdrawn from the container 10. This percolating action is accomplished in a few minutes' time and the coffee is then ready to be served.

Where electricity is available, an electric heating coil may be utilized for effecting the generation of the steam to roast the coffee and brew the same. Reference being had to Figs. 5 and 6, a coil 35 having the terminals 35' for introducing suitable supply of current is imbedded in a base receptacle 36 immediately below the water container 37. This coil is in series with further coils 38 located within the respective flues 39 through which, in the previously described embodiment, the heated gases passed. The construction and operation are otherwise precisely similar.

Figure 7:
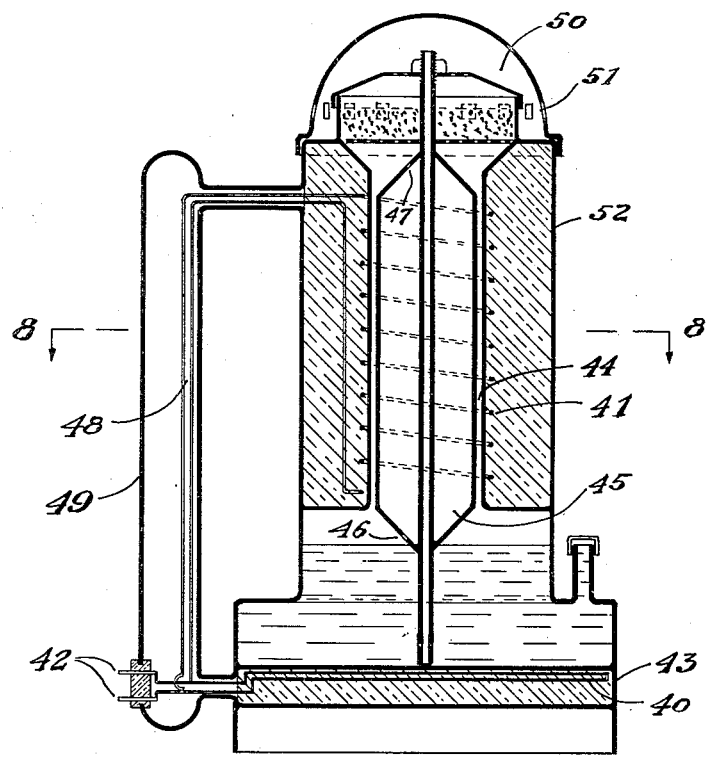
Figs. 7 and 8 are similar views of a further modification.
Figure 8:
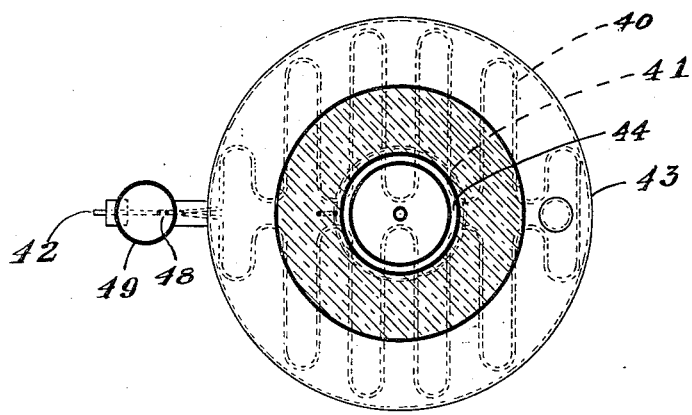

A modification in the arrangement of the coils is indicated in Figs. 7 and 8 in which there are shown two separate and independent coils 40 and 41, the same being connected in parallel with the terminals 42 through which a source of electricity may be introduced to the apparatus. The coil 40 is similarly located in a base receptacle 43 while the other coil 41 is provided about the single superheating passageway 44 having within the same the coaxial flue 45 through which, in this instance, steam also passes, lower openings 46 being provided in the bottom of said flue and openings 47 at the top thereof.

To conveniently introduce the current to the coil 41, the leads 48, connected in parallel with the terminals 42, may be concealed and brought to the interior of the apparatus by providing a hollow handle member 49 between the lower and upper portions of the apparatus and passing the said leads therethrough. The hood or cap member 50 with circumferential openings 51 also is shortened, fitting then over the top of a false or finishing jacket 52.

Figure 9:
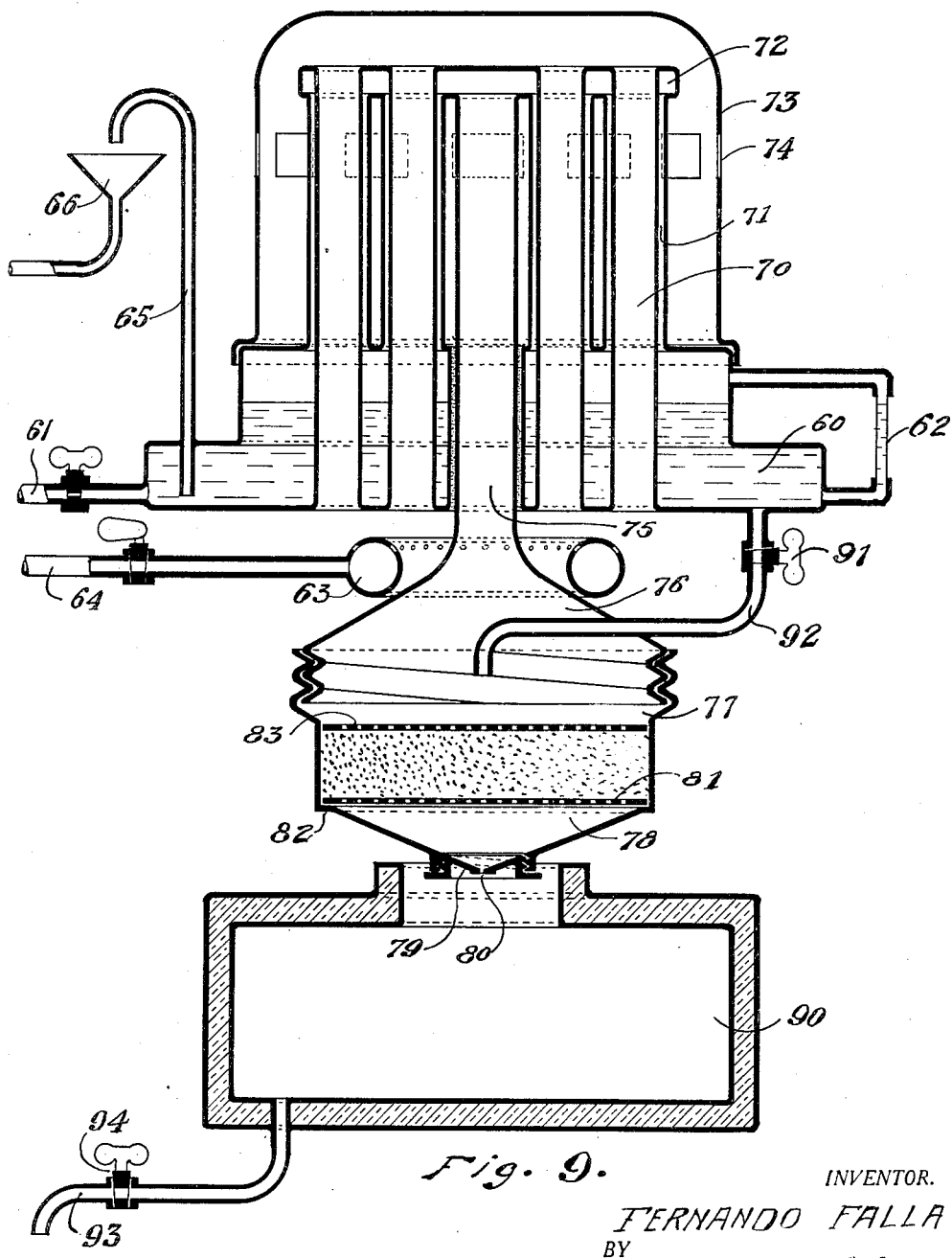
Fig. 9 is a vertical section through a combined roasting and brewing apparatus especially adapted for preparing larger quantities of the beverage.

In Fig. 9 there is indicated an arrangement embodying the aforesaid principles but whereby it is not required that after the drying and roasting operation the apparatus be inverted manually to effect the brewing operation; and said apparatus, moreover, is more particularly adapted for preparing coffee on a large scale as in hotels, restaurants and the like. To this end, the water container 60 is of considerably larger proportions and is filled from a suitable inlet supply pipe 61, the container being equipped with a gauge glass 62 to assist in determining the proper level.

A gas heating-member or annular burner 63 is provided below the said container, the gas being supplied thereto from a suitable feed pipe 64; also, a venting and pressure pipe 65 extends into the bottom of container 60 and is designed to discharge into a drain 66 should the pressure become excessive within the said container. Suitable vertical flues 70 are provided with surrounding superheating passageways 71, the discharge ends of which are all united in the chamber 72, as in the embodiment described in connection with the apparatus shown in Figs. 1-4, inclusive. A hood or cap 73 having the circumferential discharge openings 74 for the spent heating gases is likewise provided and is designed to rest upon the top of container 60.

Chamber 72, however, does not continue upwardly as in the aforesaid embodiment, but a duct 75 extends therefrom axially of the apparatus and downwardly through the burner apparatus 63, terminating in a receptacle 76. This receptacle is provided with a bottom portion 77 which is removably fitted thereto, as by being screwed thereon, and may thus be removed by unscrewing the same from the portion 76. The bottom 77 at its lower end terminates in a frusto-conical portion 78 which is internally threaded at its lower end, as shown, and to which may be attached a conical outlet or drip member 79 having the relatively small opening 80. When this drip member is removed, a comparatively large opening is provided to permit ready escape of the superheated steam after the same has passed through the coffee. This is retained within the bottom member 77 as upon a perforated screen member 81 which rests upon a circular ledge 82 of the bottom member and formed above the conical portion thereof. Over the coffee charge it is preferred to place a further perforated and floating screen 83 which will serve to compact the same and prevent it from being blown about by the incoming steam.

After the roasting operation has been accomplished and the burner shut off, a thermally insulated serving receptacle 90 is located beneath the bottom portion and the drip element 79 screwed into place. Thereupon, valve 91 in a pipe 92, affording communication between the bottom of container 60 and the receptacle 76, is opened to cause the still boiling water within container 60 to be discharged above the screen 83 and to percolate through the coffee, the brewed coffee dripping then out through the opening 80 into container 90 from which it may be served as required through the outlet 93 controlled by the valve 94 in the usual manner.

I claim:

1. A combined roasting and brewing apparatus, comprising a container for liquid having an upper portion of cross-sectional area substantially less than the cross-sectional area of the lower portion, superheating passageways in communication with the upper portion of the container, means to heat said passageways and the liquid to vaporize a portion of the latter, a receptacle for receiving a charge of material to be roasted and communicating with the liquid container, said receptacle being provided with an outlet for the vapors of the liquid which outlet is adapted also to pass the unvaporized balance of the liquid in the container.

2. A combined roasting and brewing apparatus, comprising a container for liquid, a vertically disposed flue associated with the container for directing heated gas upwardly, a superheating annular passageway in communication with the container and associated with the flue for superheating vapor generated in said container, a receptacle for receiving a charge of material to be roasted, said receptacle being in communication with the superheating passageway and provided with an outlet, and means to admit the liquid of the container to said receptacle.

3. A combined roasting and brewing apparatus, comprising a container for liquid, a vertically disposed flue associated with the container for directing heated gas upwardly, a superheating annular passageway in communication with the container and associated with the flue for superheating vapor generated in said container, a receptacle for receiving a charge of material to be roasted, said receptacle being in communication with the superheating passageway and provided with an outlet, a bottom portion for holding the charge and removably attached to the receptacle, and means to admit the liquid of the container to said receptacle.

4. A combined roasting and brewing apparatus, comprising a container for liquid, a vertically disposed flue associated with the container for directing heated gas upwardly, a superheating annular passageway in communication with the container and associated with the flue for superheating vapor generated in said container, a receptacle for receiving a charge of material to be roasted, said receptacle being in communication with the superheating passageway and provided with an outlet, removable means adapted to fit said outlet of the receptacle to reduce its cross-sectional area, and means to admit the liquid of the container to said receptacle.

5. A combined roasting and brewing apparatus, comprising a container for liquid, a vertically disposed flue associated with the container for directing heated gas upwardly, a superheating annular passageway in communication with the container and associated with the flue for superheating vapor generated in said container, a receptacle for receiving a charge of material to be roasted, said receptacle being in communication with the superheating passageway and provided with an outlet, a pipe and valve included therein for draining the water from the container into said receptacle, and a venting pipe communicating with the container.

6. A combined roasting and brewing apparatus, comprising a container for liquid, a plurality of vertically disposed flues associated with the container for directing a heated gas upwardly, superheating annular passageways coaxial with said flues and in communication with the container, a receptacle beyond the ends of the flues for receiving a charge of material to be roasted and a removable cover therefor, said receptacle being in communication with the superheating passageways, and a perforated diaphragm within the receptacle for supporting the charge therein.

7. A combined roasting and brewing apparatus, comprising a container for liquid, a plurality of vertically disposed flues passing therethrough for directing a heated gas upwardly, superheating annular passageways coaxial with said flues and in communication with the container, a receptacle beyond the upper ends of the flues for receiving a charge of material to be roasted and a removable cover therefor, said receptacle being in communication with the superheating passageways, and a perforated diaphragm within the receptacle for supporting the charge therein.

8. A combined roasting and brewing apparatus, comprising a container for liquid, a plurality of vertically disposed flues associated with the container for directing a heated gas upwardly, superheating annular passageways coaxial with said flues and in communication with the container, a receptacle beyond the upper ends of the flues for receiving a charge of material to be roasted and a removable cover therefor, said receptacle being in communication with the superheating passageways, a perforated diaphragm within the receptacle for supporting the charge therein, and a removable hood adapted to surround the cover and superheating passageways and to rest upon the container, said hood having openings to the atmosphere.

9. A combined roasting and brewing apparatus, comprising a container for liquid, a plurality of vertically disposed flues associated with the container for directing a heated gas upwardly, superheating annular passageways coaxial with said flues and in communication with the container, a receptacle beyond the upper ends of the flues for receiving a charge of material to be roasted and a removable cover therefor, said receptacle being in communication with the superheating passageways, a perforated diaphragm within the receptacle for supporting the charge therein, and a safety and venting tube extending from the container through the receptacle cover.

10. A combined roasting and brewing apparatus, comprising a container for liquid and of increased cross-sectional area at the lower portion, heating means associated with the container, a superheating passageway in communication with the container and subjected to heat from the heating means, a receptacle for receiving a charge of material to be roasted and a removable cover therefor, said receptacle being in communication with the superheating passageway, and a perforated diaphragm within the receptacle for supporting the charge therein.

11. A combined roasting and brewing apparatus, comprising a container for liquid to be heated, means to heat the liquid to vaporize a portion thereof, a receptacle for receiving a charge of material carried by the container above the liquid therein and permanently in communication with the liquid container for receiving the heated vapors therefrom to roast the charge, a removable closure element for the receptacle provided with a permanently open outlet for the said vapors and through which also is adapted to pass the unvaporized balance of the liquid in the container when the apparatus is inverted.

12. A combined roasting and brewing apparatus, comprising a container for liquid to be heated, means to both heat the liquid to vaporize a portion thereof and superheat the resulting vapor, a receptacle for receiving a charge of material and permanently in communication with the liquid container for receiving the superheated vapors therefrom to roast the charge, said receptacle being provided with a permanently open outlet for the said vapors and through which also is adapted to pass the unvaporized balance of the liquid in the container when the apparatus is inverted.

FERNANDO FALLA.